a2 United States Patent
Ohishi et al.

(10) Patent No.: US 7,436,593 B2
(45) Date of Patent: Oct. 14, 2008

(54) SCREEN, FRESNEL LENS SHEET USED THEREFOR, AND IMAGE DISPLAY APPARATUS USING THE SAME

(75) Inventors: Tetsu Ohishi, Hiratsuka (JP); Hiroki Yoshikawa, Hiratsuka (JP); Koji Hirata, Yokohama (JP); Daisuke Imafuku, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 287 days.

(21) Appl. No.: 11/065,292

(22) Filed: Feb. 25, 2005

(65) Prior Publication Data

US 2006/0001966 A1    Jan. 5, 2006

(30) Foreign Application Priority Data

Jul. 1, 2004 (JP) .............................. 2004-195130

(51) Int. Cl.
 G03B 21/56 (2006.01)
 G03B 21/60 (2006.01)
(52) U.S. Cl. ...................... 359/457; 359/456; 359/454; 359/460
(58) Field of Classification Search ................ 359/443, 359/456, 457, 454
See application file for complete search history.

(56) References Cited

U.S. PATENT DOCUMENTS

| 5,751,478 A * | 5/1998 | Yoshimura et al. .......... 359/453 |
| 6,726,859 B2 | 4/2004 | Suzuki et al. |
| 2003/0174396 A1* | 9/2003 | Murayama et al. .......... 359/453 |
| 2004/0047037 A1* | 3/2004 | Peterson et al. ............. 359/457 |
| 2005/0099687 A1* | 5/2005 | Watanabe .................... 359/455 |

* cited by examiner

*Primary Examiner*—Diane I. Lee
*Assistant Examiner*—Magda Cruz
(74) *Attorney, Agent, or Firm*—McDermott Will & Emery LLP (57) ABSTRACT

Images that are bright even on the periphery of a transmissive screen are obtained by reducing reflection loss of the screen when the screen incident angle of the image light entering the upper left and right ends of the screen increases. Incident-side prisms (10), each having at least a plane-of-incidence (c) onto which light comes in, an exit face (d) from which the light that has come in from the plane-of-incidence exits after being refracted, and a refractive face (e) on which the light that has exited from the exit face is refracted and then guided to the image-viewing side of the Fresnel lens sheet (6), are provided in the range where the incident angle of the incoming light becomes equal to or greater than approximately 40 degrees.

18 Claims, 9 Drawing Sheets

SCREEN, FRESNEL LENS SHEET USED THEREFOR, AND IMAGE DISPLAY APPARATUS USING THE SAME

CLAIM OF PRIORITY

The present application claims priority from Japanese Application serial no. JP 2004-195130 field on Jul. 1, 2004, the content of which is hereby incorporated by reference into this application.

BACKGROUND OF THE INVENTION (1) Field of the Invention

The present invention relates to an image display apparatus for enlarging and projecting the image generated by an image generation source, and displaying this image in an enlarged and projected form on a transmissive screen. The invention also relates to the screen and Fresnel lens sheet used for the image display apparatus.

(2) Description of the Related Art

A projection-type image display apparatus (hereinafter, may be called the set) enlarges and projects, via a projection lens and/or the like, the image displayed by a compact image generation source such as a projection-type cathode-ray tube, liquid-crystal display apparatus, or the like, sends the enlarged and projected image to a transmissive screen, and thus forms the image thereon.

Such a type of set is required to be thinned down (reduced in depth) to reduce weight, costs, and an installation space requirement. Known configurations of transmissive screens for use with a thinned-down set include one described in, for example, Patent Document U.S. Pat. No. 6,726,859.

SUMMARY OF THE INVENTION

The set can be thinned down (reduced in depth) by using a wider-angle projection lens, reducing the projection distance of the projection lens, and further decentering its optical axis downward with respect to the center of the transmissive screen (e.g., aligning the optical-axis center of the projection lens with the central lower end of the transmissive screen).

Figure 10:
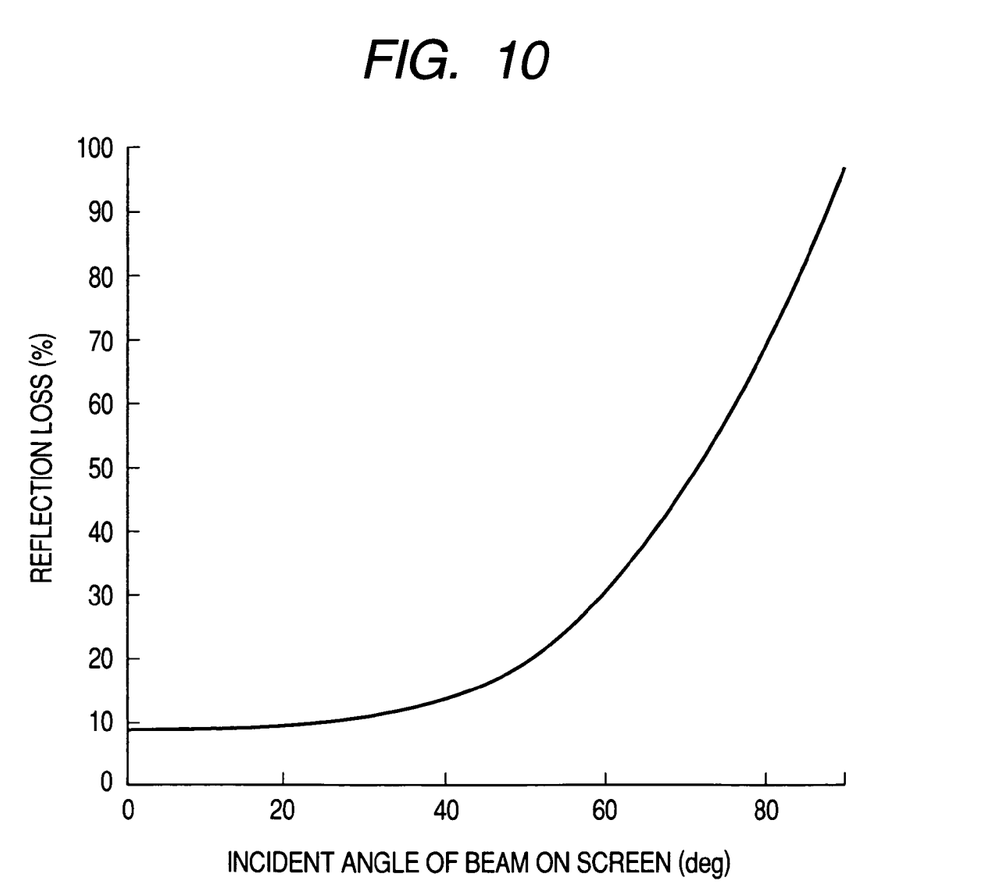
FIG. 10 is a diagram representing the relationship between the incident angle of light beams on the screen of a general exit-face Fresnel lens, and reflection loss.

In such a configuration, however, for example, if the size of the screen (16:9 in terms of aspect ratio), the projection distance of the projection lens, and the depth of the set are 65" diagonal, 500 mm, and 350 mm, respectively, the incident angle of the image light entering the upper left and right ends of the transmissive screen from the projection lens increases to 65.2 degrees. FIG. 10 is a diagram representing the relationship between the incident angle of light beams on the screen in a general exit-surface Fresnel lens, and reflection loss. It can be seen from FIG. 10 that for a light-beam incident angle of 65.2 degrees, the reflection loss of the screen increases to as much as 36%. Further thinning-down of the set abruptly increases the loss and poses the problem that the upper left and right ends of the screen decrease in brightness.

The above Patent Document (U.S. Pat. No. 6,726,859) discloses a transmissive screen that responds to such thinning-down of the set by providing refractive prisms and totally reflective prisms alternately on the light entrance surface of a Fresnel lens sheet, and making the exit surface of light into a plane. The configuration described in the above Patent Document, however, poses the problem that since refractive prisms are provided on the light entrance surface of the Fresnel lens sheet, efficiency decreases and, in particular, a medium-band image (on the screen, a donut-like range) important for obtaining high total image quality becomes dark.

In addition, in the configuration with refractive prisms and totally reflective prisms on the Fresnel lens sheet, the discontinuity of light may occur at the interface between the refractive prism section and the totally reflective prism section. If the discontinuity of light actually occurs, the image when viewed from the front will include discontinuous portions and deteriorate in image quality. Furthermore, the flare occurring in the refractive prisms (the flare caused by the reflection, refraction, or other actions of light, is the event that the light itself becomes indistinct) and the flare occurring in the totally reflective prisms may differ in terms of direction. If the difference in the direction of the flare actually occurs, even when the image as viewed from the front is always the same in brightness, even a slight change in the viewing direction (angle) of the image makes it appear to be different in brightness. Such flare different in the direction of occurrence also causes image deterioration.

Accordingly, for a transmissive screen responding to the thinning-down of the set, it is important to reduce the reflection loss of light on the incident plane of the screen and to improve utilization efficiency of the light and make the image brighter (i.e., to suppress decreases in the brightness of the image, particularly on its periphery). It is also important to suppress the image deterioration caused particularly by the discontinuity of the light that is readily identifiable when the screen is viewed, or by flare whose direction of occurrence differs.

The present invention has been made with the above situations taken into consideration, and an object of the invention is to provide a technique suitable for reducing the depth of an image display apparatus while at the same time obtaining high-quality images.

In order to achieve the above object, the present invention has multiple optical elements at the image generation source side of a Fresnel lens sheet. Each of these optical elements has: a plane-of-incidence to which incident light comes in; an exit face from which the incident light from the plane-of-incidence exits after being refracted; and a refractive face on which the exit light from the exit face is refracted and then guided to the image-viewing side of the Fresnel lens sheet. These optical elements (hereinafter, called the first incident-side prisms) are provided in the region where the incident angle of light becomes a required (predetermined) value or more (e.g., 40 degrees or more), at the image generation source side of the Fresnel lens sheet.

In the above configuration of the present invention, light incident on, for example, the end of the screen at large incident angles (e.g., 40 degrees or more) is caused to exit after undergoing three-level refraction on the plane of incidence, exit face, and refractive face of each of the first incident-side prism. This allows the exit direction of the light of a large incident angle to be approached to a direction parallel to the optical axis of the Fresnel lens sheet. This, in turn, allows light incident on the end of the screen to be effectively used as the light for forming an image on the screen. According to the present invention, therefore, it is possible to reduce a loss of light at the end of the screen and obtain a bright image even on the periphery of the screen. Additionally, in the present invention, since each of the incident-side prisms does not have a reflective face and is constructed only of refractive faces, the direction of the flare occurring in the prisms can always be kept constant and this allows suppression of image deterioration due to the flare.

The region at the image generation source side of the Fresnel lens sheet where the incident angle of light is to be reduced below a required (predetermined) value may also be a planar section. In addition, second incident-side prisms may be provided that each has a refractive face for refracting incident light and guiding the light to the image-viewing side. At this time, it is preferable that the exit angle of the light exiting the planar section or the refractive face of each second incident-side prism, and the exit angle of the light exiting the refractive face of each first incident-side prism should be approximately equal to each other.

Furthermore, exit-side prisms each including a refractive face that refracts the light passing through the Fresnel lens sheet and causes the light to go out as light approximately parallel to the optical axis of the Fresnel lens sheet may be provided at the image-viewing side thereof. These exit-side prisms may otherwise be provided in a range that includes a region opposite to the above planar section. Moreover, the refractive index of the material forming the first incident-side prism section may be reduced below that of the material forming the exit-side prism section.

According to the present invention, it is possible to thin down an image display apparatus while at the same obtaining high image quality.

DETAILED DESCRIPTION OF THE PREFERRED EMBODIMENTS

Embodiments of the present invention are described below referring to the accompanying drawings.

Figure 1:
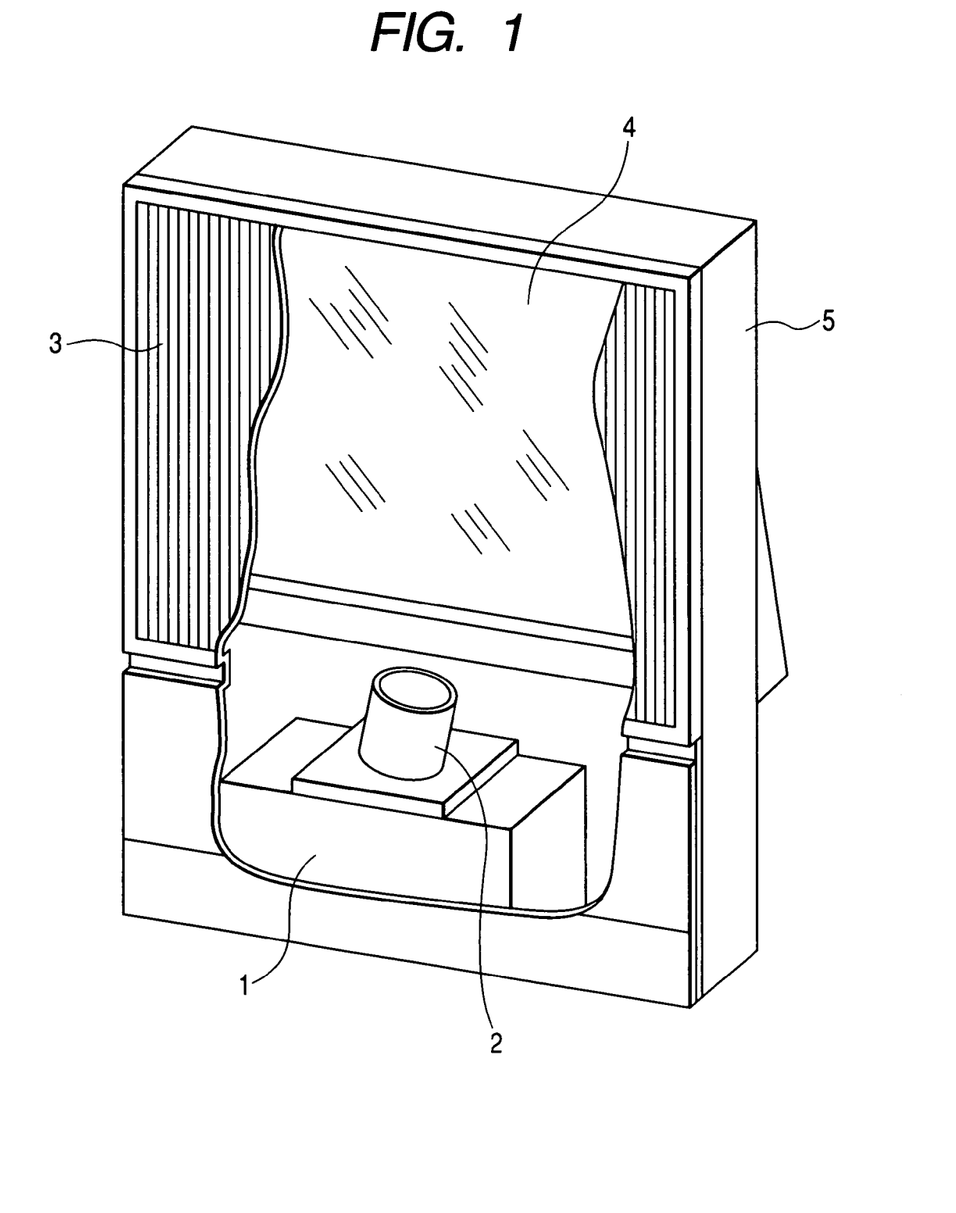
FIG. 1 is a view showing an example of an image display apparatus to which the present invention is applied.

FIG. 1 is a perspective view showing partly in section an example of an image display apparatus according to the present invention. An image generation source 1 is constituted by a projection cathode-ray tube or a reflective or transmissive liquid-crystal panel, an image modulation element with a plurality of very small mirrors, such as a display element, and other elements. The image generation source 1 displays a compact image. A projection lens 2 that is an optical component projects the image onto a back-projection screen 3. Since the projection lens is generally long in projection distance, a reflecting mirror 4 is provided halfway on an optical path of the projection lens in order to reduce a depth of the image display apparatus. These elements are fixed to required positions inside an enclosure 5.

Figure 2:
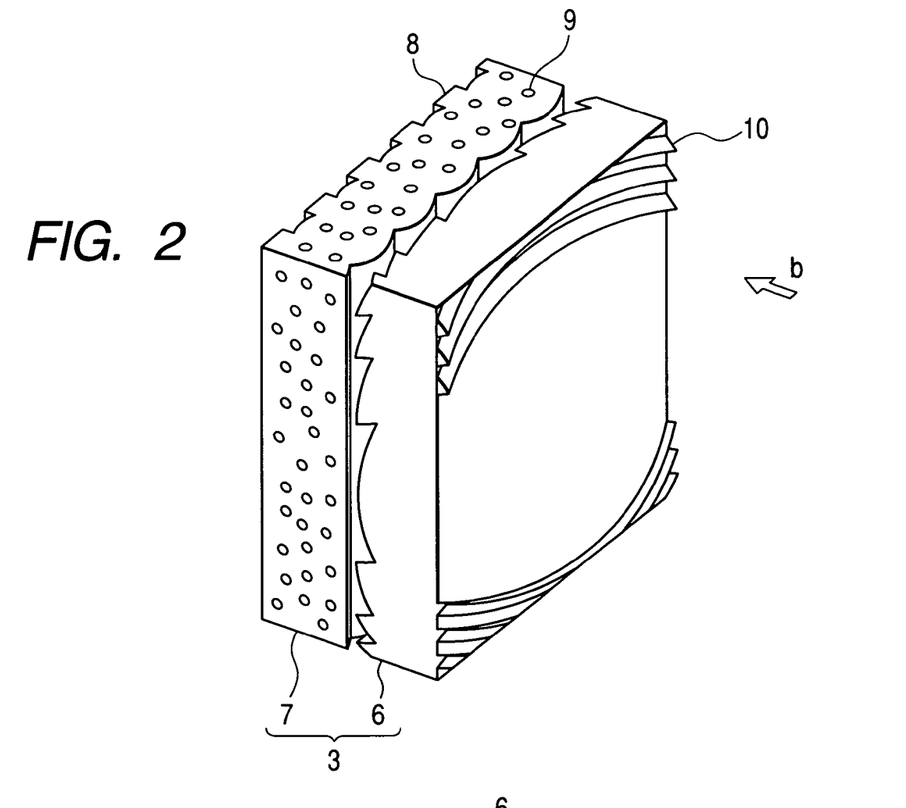
FIG. 2 is a schematic view showing the structure of a projection screen 3 according to the present invention.

FIG. 2 is a schematic view showing a structure of the back-projection screen 3 according to the present invention. The enlarged image (not shown) projected from a direction of arrow "b" is converted, at a Fresnel lens sheet 6, into approximately parallel light or the light directed slightly inward, and the image light enters a lenticular lens sheet 7. As shown, the lenticular lens sheet 7 formed with a plurality of lenticular lenses arrayed in a horizontal direction of the screen with its vertical direction taken as a longitudinal direction of the lenticular lenses diffuses the above image light in the horizontal direction of the screen. On an exit face of the lenticular lens sheet 7, black stripes extending in the vertical direction of the screen are formed to absorb the external light entering from the exit side of the screen. The lenticular lens sheet 7 also contains a diffusing material 9 to diffuse the image light in the horizontal and vertical directions of the screen. In an embodiment of the back-projection screen of FIG. 2 according to the present invention, a plurality of incident-side prisms 10 are provided as refractive optical elements at the image generation source side of the Fresnel lens sheet. These incident-side prisms 10 are provided in the range where an incident angle of the light projected from the direction of arrow "b", with respect to the Fresnel lens sheet, becomes at least approximately 40 degrees or more. Each of the optical elements in the present embodiment has: a plane-of-incidence to which incident beams of light come in; an exit face from which the incident light from the plane-of-incidence exits after being refracted; and a refractive face on which the exit light from the exit face is refracted and then guided to the image-viewing side of the Fresnel lens sheet.

Figure 3:
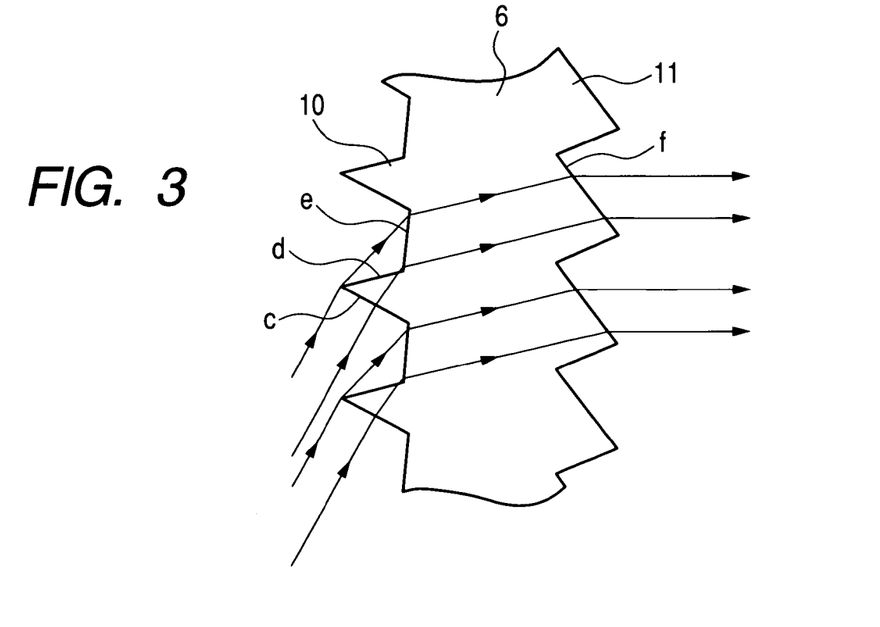
FIG. 3 is a longitudinal sectional view of a Fresnel lens sheet 6 according to an embodiment of the present invention.

Operation of the prisms 10 is described hereunder using FIG. 3. FIG. 3 is a longitudinal sectional view of the Fresnel lens sheet 6 shown in FIG. 2. A section neighboring an upper left (right) end of the back-projection screen 3 is shown in an enlarged form in FIG. 3. The arrow shown therein indicates a direction of beams. As shown in FIG. 3, the incident-side prisms 10 are provided at the image generation source side of the Fresnel lens sheet 6, and refractive exit-side prisms 11 are provided at the image-viewing side. Incident beams from the image generation source side arrive at face "c" (entrance face) of each incident-side prism 10 and are refracted on face "c". The beams that have thus been refracted go out from face "d" (exit face) and after temporarily passing through air, they enter face "e" (refractive face) and are refracted thereon. After this, the beams undergo further refraction at each of the exit-side prisms 11 and then exit in an approximately horizontal direction (a direction parallel to an optical axis of the Fresnel lens sheet 6) toward the image-viewing side. The angle of the beams which refracted at this time can be made approximately horizontal by increasing the angle formed by face "e" and a principal plane of the Fresnel lens sheet 6, namely, by increasing a projecting level of face "e" toward the image generation source side. In the present embodiment, the above angle of face "e" is reduced (namely, face "e" is brought close to the principal plane of the Fresnel lens sheet 6) to maintain the refracted beams at a large angle, refract the beams at the exit-side prism 11, and make the beams exit in an approximately horizontal direction toward the image-viewing side. The reason for the reduction of the angle is described below per FIG. 4.

Figure 4:
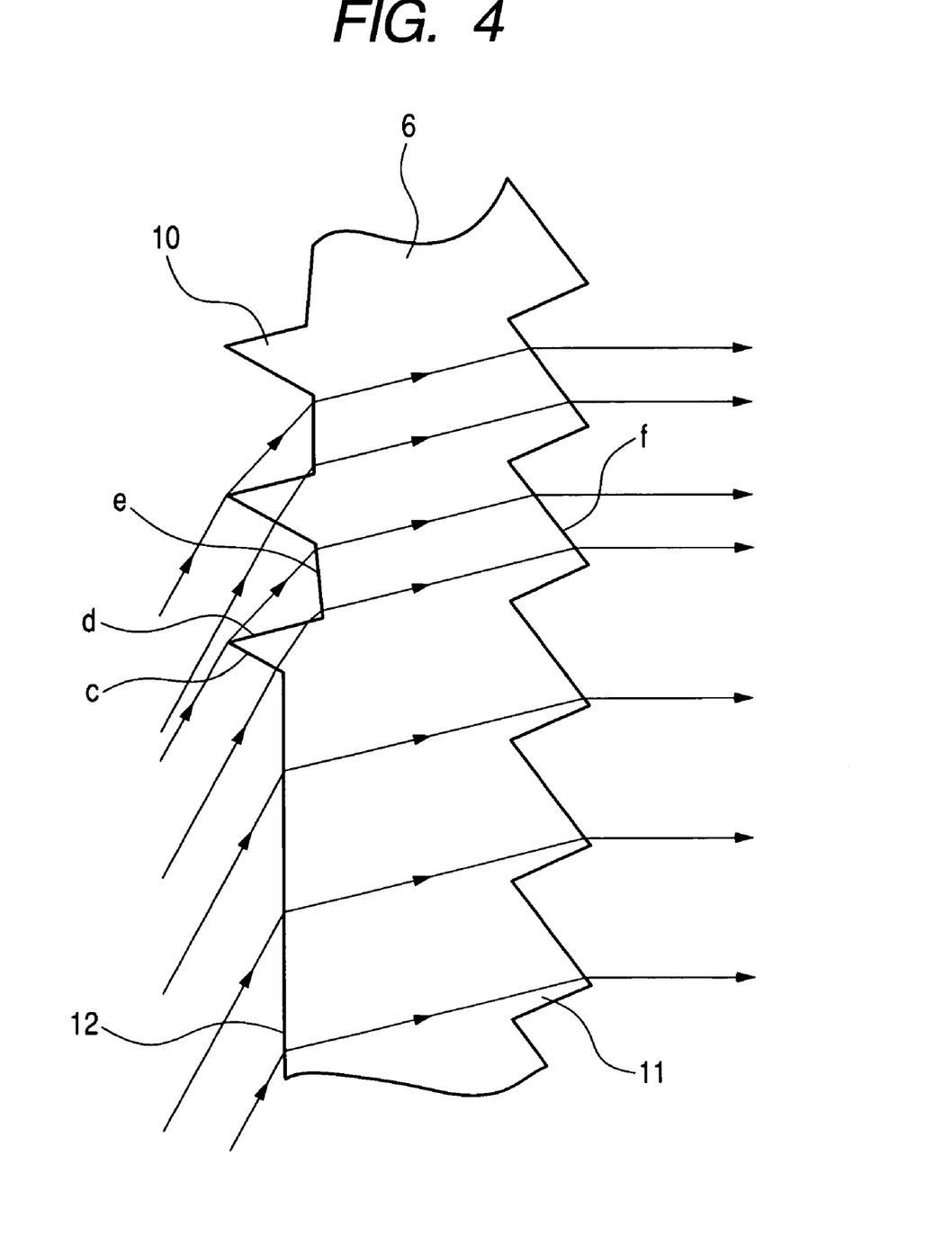
FIG. 4 is another longitudinal sectional view of the Fresnel lens sheet 6 according to the above embodiment of the present invention.

FIG. 4 is another longitudinal sectional view of the Fresnel lens sheet 6 according to the present embodiment, showing in an enlarged form an interface between the first incident-side prism section 10 and a planar section 12. As shown in FIG. 4, the region where image light enters at a required (predetermined) incident angle (e.g., 40 degrees or more), at the image generation source side of the Fresnel lens sheet 6, is the planar section 12 at which the first incident-side prism section 10 is not provided. Since the light entering the above region is small in incident angle, reflection loss of the light is insignificant as shown in FIG. 10. To reduce reflection loss and improve efficiency, therefore, it is preferable that a region small in incident angle of incident light should be formed into a planar shape, rather than having prisms similar to the first incident-side prisms 10. Accordingly, in the present embodiment, the region where image light enters at small incident angles, at the image generation source side of the Fresnel lens sheet 6, is formed as the planar section 12 to improve utilization efficiency of the light in the region. The exit-side prisms 11 are provided as normal-type exit-face Fresnel lens at the image-viewing side of the Fresnel lens sheet 6. Therefore, a shape of the surface at the image generation source side of the Fresnel lens sheet 6 in the present embodiment suddenly changes from flatness of the planar section 12 to an indented shape of the section provided with the first incident-side prism section 10. For this reason, there is a need to prevent a disturbance of the image light due to the sudden change in the shape of the surface from appearing on the image.

Incidentally, for the Fresnel lens sheet 6, the section at the image generation source side that includes the incident-side prism section 10, and the section at the image-viewing side that includes the exit-side prism section 11 are molded independently. If molding accuracy is low, therefore, a shift in position (a shift in the vertical or horizontal direction of the screen) may occur between the incident-side prism section 10 and exit-side prism section 11 of the Fresnel lens sheet 6. If the shift in position actually occurs, this easily results in or makes conspicuous the above disturbance of image light. In the present embodiment, the following measures are taken to suppress the disturbance of the image light due to such a positional shift. That is, the beams that enter face "c" of the incident-side prism section 10, then pass through face "d", and after being refracted at face "e", enter face "f" of the refractive exit-side prism section 11, and the beams that enter the planar section 12 and after being refracted thereat, enter face "f" of the refractive prism section 11, are set to be approximately equal in angle. This state is shown in FIG. 4. Accordingly, when four to five exit-side prisms 11 in a range across the above interface are made approximately equal to one another in terms of angle (the angle formed by the principal plane of the Fresnel lens sheet 6 and refractive face "f" of the exit-side prism section 11), the angle of the beams exiting the Fresnel lens sheet 6 is kept constant, even if the above positional shift occurs. In such a configuration, therefore, it is possible to suppress a disturbance of image light due to the above sudden change in the shape of the surface at the image generation source side.

Figure 5A:
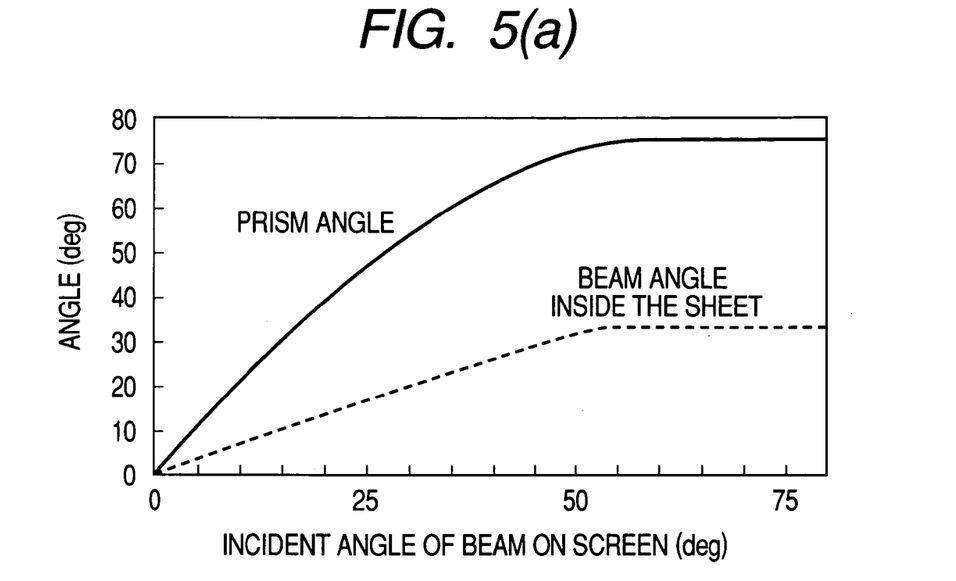
FIGS. 5A and 5B are diagrams that show optical characteristics of the Fresnel lens sheet 6 according to the above embodiment of the present invention.
Figure 5B:
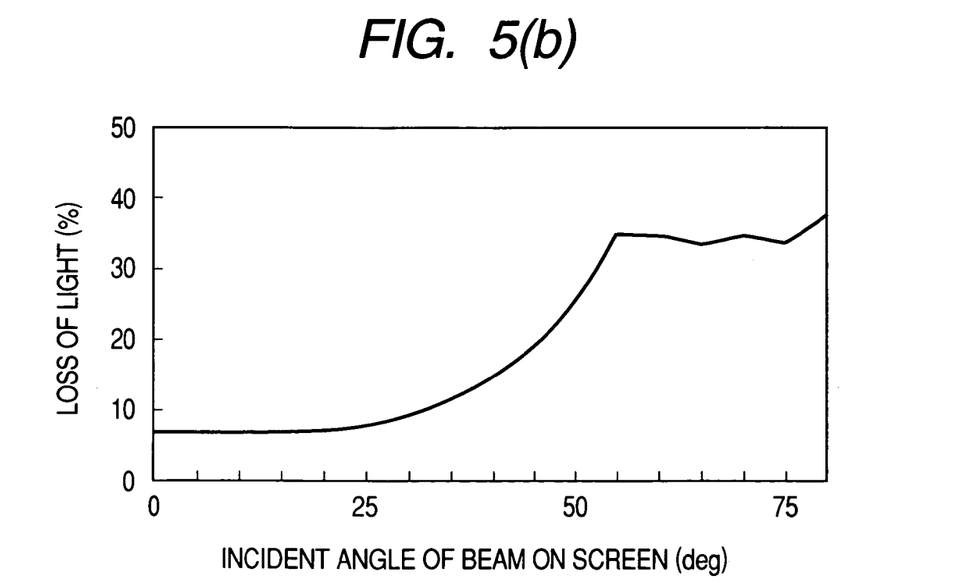

Next, a prism angle of the exit-side prism section 11 in the present embodiment (i.e., the angle formed by the principal plane of the Fresnel lens sheet 6 and refractive face "f" of the exit-side prism section 11) is described below using FIGS. 5A and 5B. FIG. 5A represents a relationship between an internal beam angle of the Fresnel lens sheet 6 and the prism angle of the exit-side prism section 11 of the Fresnel lens sheet 6 in the present embodiment. The above internal beam angle is equivalent to an angle of beams incident on face "f" of the exit-side prism section 11. FIG. 5B represents a relationship between a screen incident beam angle of the Fresnel lens sheet 6, and reflection loss thereof. The solid line and dotted line shown in FIG. 5A denote the prism angle of the exit-side prism section 11 and the internal beam angle of the Fresnel lens sheet 6, respectively. As shown in FIG. 5A, in a screen incident beam angle region from a point of 55 degrees onward, the prism angle of the exit-side prism section 11 is maintained at a constant value of 75 degrees. The incident-side prism section 10 is provided in the screen incident beam angle region from the point of 55 degrees onward, at the image generation source side of the Fresnel lens sheet 6. Therefore, light that exits refractive face ("c") of the incident-side prism section 10 on the Fresnel lens sheet 6 and then enters the exit-side prism section 11 takes almost the same angle value as that of the light exiting the planar section 12 and then entering the exit-side prism section 11. Hence, since the prism angle of the exit-side prism section 11 is maintained at a constant value of 75 degrees, an angle of the beams exiting the Fresnel lens sheet 6 is kept constant.

Additionally, as shown in FIG. 5B, loss of light at the Fresnel lens sheet according to the present embodiment is almost constant, even at screen incident beam angles of 55 degrees or more. This means that as shown in FIG. 10, sudden increases in reflection loss in the region where the screen incident beam angle equals or exceeds a required (predetermined) value are suppressed in the present embodiment.

In above-mentioned FIGS. 5A and 5B, loss of light is as much as 35% since the figures assume that both the material constituting the incident-side prism section 10 and the material constituting the exit-side prism section 11 have a refractive index of 1.45. Refractive power of the material constituting the exit-side prism section 11 can be augmented by increasing the refractive index of this material to reduce the above loss. Next, loss of light at the screen is described below taking an example in which the constituting material of the exit-side prism section 11 and that of the incident-side prism section 10 have refractive indices of 1.50 and 1.45, respectively.

Figure 6A:
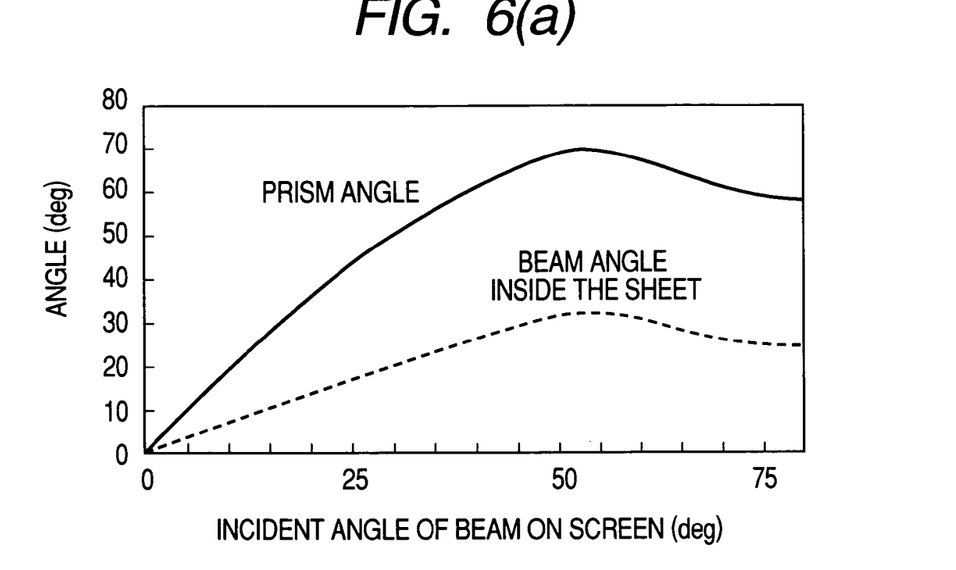
FIGS. 6A and 6B are diagrams that show optical characteristics of a Fresnel lens sheet 6 according to another embodiment of the present invention.
Figure 6B:
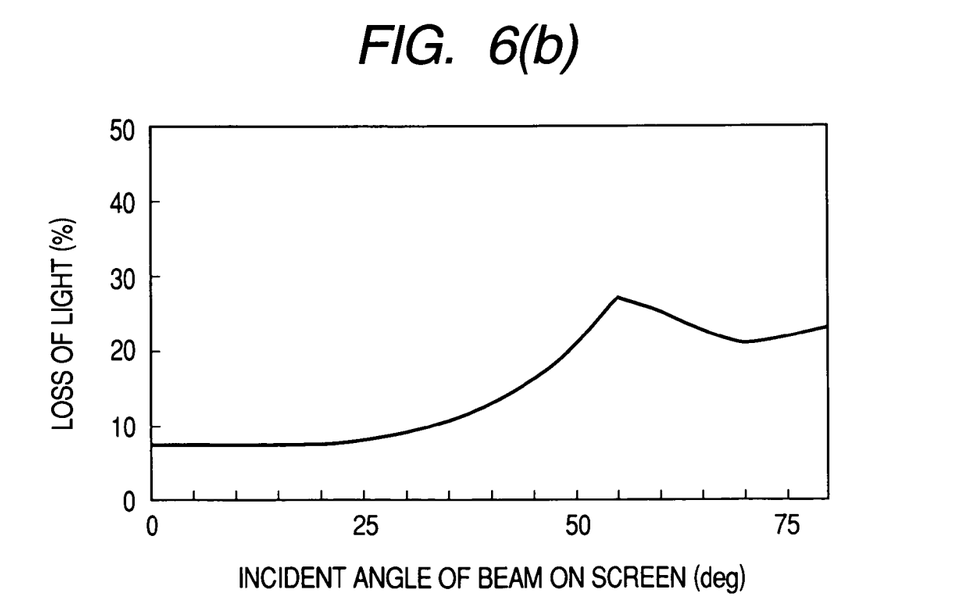

FIG. 6A represents a relationship between an internal beam angle of a Fresnel lens sheet 6 and a prism angle of an exit-side prism section 11 in the embodiment where a constituting material of the exit-side prism section 11 and that of the incident-side prism section 10 differ in refractive index. The above internal beam angle is equivalent to an angle of beams incident on face "f" of the exit-side prism section 11. FIG. 6B represents a relationship between a screen incident beam angle of the Fresnel lens sheet 6, and reflection loss thereof, in the present embodiment. The solid line and dotted line shown in FIG. 6A denote the prism angle of the exit-side prism section 11 and the internal beam angle of the Fresnel lens sheet 6, respectively. As shown in FIG. 6A, in a screen incident beam angle region from a point of 55 degrees onward, the prism angle of the exit-side prism section 11 gradually decreases as the incident beam angle increases. The incident-side prism section 10 is provided in the screen incident beam angle region from the point of 55 degrees onward, at the image generation source side of the Fresnel lens sheet 6. Therefore, an angle of associated refractive face "e" (i.e., the angle formed by face "e" and a principal plane of the Fresnel lens sheet 6) gradually increases as the screen incident beam angle increases. Loss of light on the Fresnel lens sheet 6 at this time, as shown in FIG. 6B, peaks at a starting point of the incident-side prism section 10 and then gradually decreases as the screen incident beam angle increases. Optical elements having the characteristics shown in FIG. 5A or 5B can be used for a normal type of image display apparatus. However, for an image display apparatus in which image periphery, in particular, deteriorates in brightness, the brightness of the periphery can be further improved by using the optical elements that have the characteristics shown in FIG. 6A or 6B.

Hence, in the present embodiment, the distribution of brightness that matches particular characteristics of the image display apparatus can be designed by setting different angles for each type of prism of the Fresnel lens sheet 6 and different refractive indices for the materials that constitute each prism section.

Under these conditions, moiré does not occur if both the incident-side prism section 10 and the exit-side prism section 11 are exactly the same in pitch and are arranged without a shift in position. However, moiré occurs if both shift in position. An embodiment for suppressing such occurrence of moiré is described below.

Figure 7:
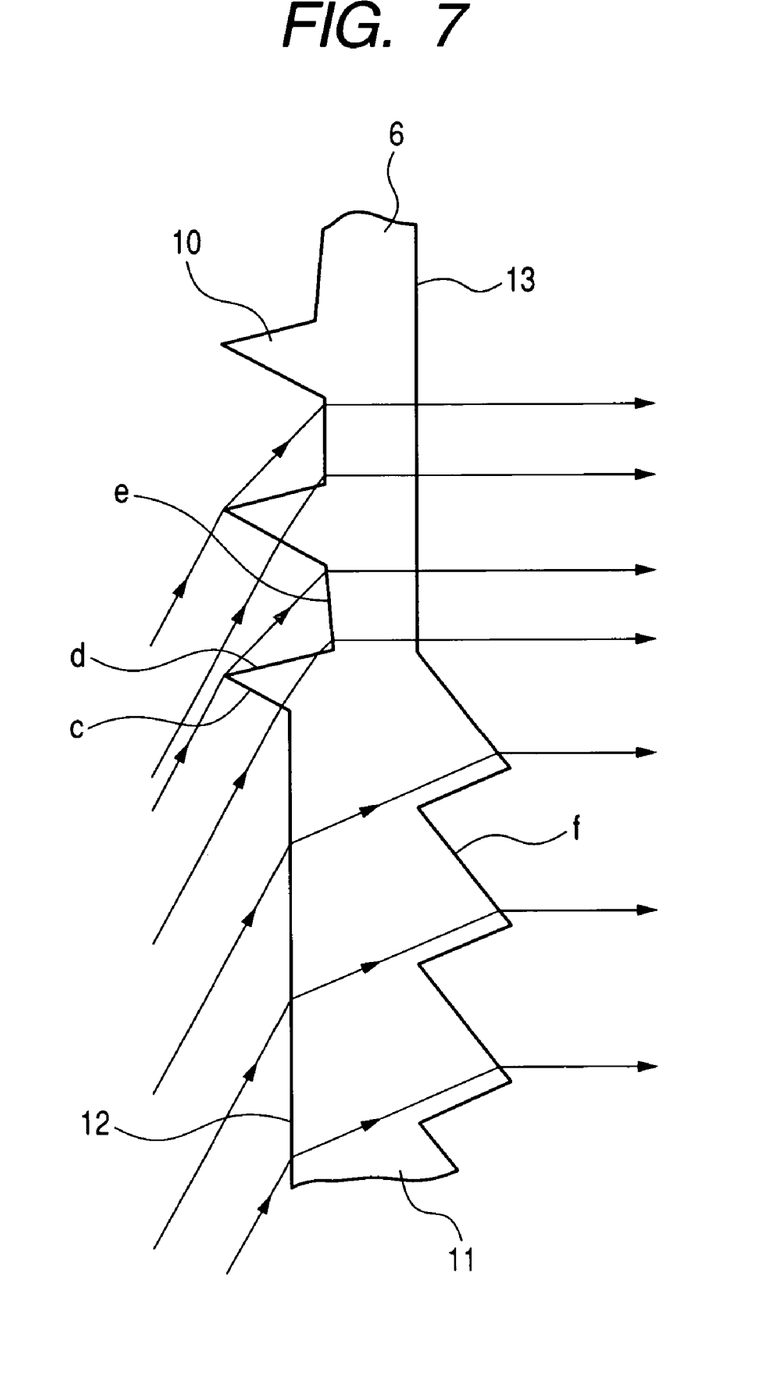
FIG. 7 is a longitudinal sectional view of a Fresnel lens sheet 6 according to yet another embodiment of the present invention.

FIG. 7 is a longitudinal sectional view showing yet another embodiment of a Fresnel lens sheet 6 according to the present invention, showing in an enlarged form an interface between an incident-side prism section 10 and a planar section 12. As shown in FIG. 7, a region in which image light enters at a required incident angle (e.g., 40 degrees or less), at the image generation source side of the Fresnel lens sheet 6, is a first planar section 12. Also, a region opposite to the first planar section 12 is provided with an exit-side prism section 11. In addition, a region in which image light enters at a required incident angle (e.g., 40 degrees or more), at the image generation source side of the Fresnel lens sheet 6, is provided with the incident-side prism section 10. A region opposite to the region where the incident-side prism section 10 is formed is provided as a second planar section 13.

In FIG. 7, after arriving at face "c" (entrance face) of the incident-side prism section 10, incident beams from the image generation source side go out from face "d" (exit face), then temporarily pass through air, and enter face "e" (refractive face) to refract thereon. The angle of the beams which refracted on and exited from face "e" at this time can be made approximately horizontal by increasing an angle of face "e" of the incident-side prism section 10 (i.e., the angle formed by face "e" and a principal plane of the Fresnel lens sheet 6). In this case, outgoing light from the Fresnel lens sheet 6 can be made into approximately parallel light without providing the exit-side prism section 11 in the region at the image-viewing side that is opposite to the incident-side prism section 10. For this reason, the region at the image-viewing side that is opposite to the incident-side prism section 10 can be formed into a planar shape, i.e., as the second planar section 13. Consequently, a region in which the incident-side prism section 10 and the exit-side prism section 11 interfere with each other is dimensionally reduced. This makes it possible to suppress the occurrence of moiré, even if the incident-side prism section 10 and the exit-side prism section 11 shift in position with respect to each other.

At this time, if the beams traveling through the Fresnel lens sheet 6 are different from one another in terms of angle, the beams intersect with one another inside the Fresnel sheet 6 and thus the angles of the beams after they have exited do not become approximately parallel. In this case, the foregoing disturbance of image light due to a change in the shape of the surface at the image generation source side is likely to appear on the image. However, when the Fresnel lens sheet 6 is sufficiently small in thickness, even if the beam angles differ inside the Fresnel lens sheet 6, the beams do not intersect too significantly during exit of the light from the Fresnel lens sheet 6. Additionally, in the present embodiment, since the after-exit beam angles are made approximately horizontal, the disturbance of image light due to a change in the shape of the surface at the image generation source side is kept from appearing on the image.

Figure 8:
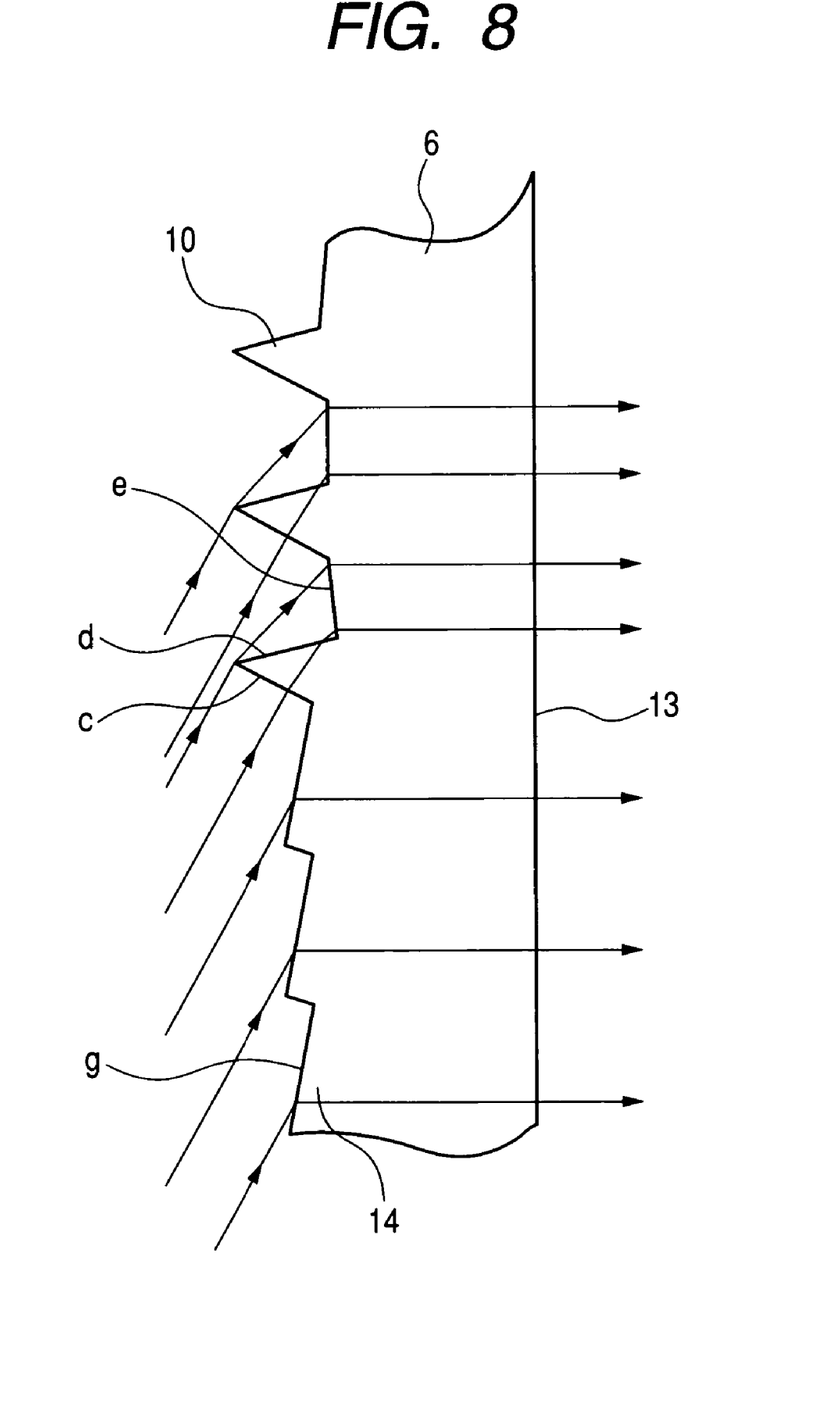
FIG. 8 is a longitudinal sectional view of a Fresnel lens sheet 6 according to a further embodiment of the present invention.

Another embodiment for suppressing the occurrence of moiré is described below. FIG. 8 shows a further embodiment of a Fresnel lens sheet 6 according to the present invention. As shown in FIG. 8, in addition to an incident-side prism section 10, an incident-side prism section 14 is provided in the region shown as the planar section 12 in FIG. 7. Hereinafter, in order to distinguish the two incident-side prism sections, the incident-side prism section 10 is called the first incident-side prism section, and the incident-side prism section 14 is called the second incident-side prism section. The first incident-side prism section 10 is the same as that shown in FIG. 4, and the same reference number or symbol as used in FIG. 4 denotes the same component or section.

In FIG. 8, the first incident-side prism section 10 is provided in the region where a screen incident beam angle equals or exceeds a required value, at the image generation source side of the Fresnel lens sheet 6. Similarly, the second incident-side prism section 14 is provided in the region where the incident beam angle is smaller than the required value, at the image generation source side of the Fresnel lens sheet 6. The second incident-side prism section 14 has refractive face "g" on which incoming light from the image generation source side is refracted and from which the light exits toward the image-viewing side. The image-viewing side of the Fresnel lens sheet 6 is formed into a flat section as a planar section 13. In the present embodiment, height of the second incident-side prism section 14 (i.e., a projection level of the prism section toward the image generation source side) is smaller than that of the first incident-side prism section 10. Also, an apex angle of the second incident-side prism section 14 is greater than that of the first incident-side prism section 10 (i.e., the angle formed by faces "c" and "d"). Additionally, the angle formed by face "g" of the second incident-side prism section 14 and a principal plane of the Fresnel lens sheet 6 is smaller than the angle formed by face "c" or "d" of the first incident-side prism section 10 and the principal plane of the Fresnel lens sheet 6. Face "e" of the first incident-side prism section 10 and face "g" of the second incident-side prism section 14 are set to have angles so that outgoing light from face "e" and outgoing light from face "g" are not only approximately parallel to each other, but also parallel to an optical axis of the Fresnel lens sheet 6. According to such a configuration, outgoing light from the Fresnel lens sheet 6 can be made into parallel light without providing an exit-side prism section 11 on an image-viewing side face of the Fresnel lens sheet 6. According to the present embodiment, therefore, since prisms and/or the like need only to be provided at the image generation source side of the Fresnel lens sheet 6, interference between the incident-side prisms and the exit-side prisms does not cause moiré. In addition, there is an advantageous effect in that the Fresnel lens sheet 6 can be manufactured even more easily.

Furthermore, the beams of light within the Fresnel lens sheet 6 that have passed through the first incident-side prism section 10 and the second incident-side prism section 14 are both approximately parallel. Accordingly, a disturbance of image light due to a sudden change in shape of the surface at the image generation source side of the Fresnel lens sheet 6 does not appear on the image.

Light may also be diffused to prevent or alleviate moiré. When the Fresnel lens sheet 6 has the first incident-side prism section 10 or the second incident-side prism section 14, a diffusing member for diffusing image light in horizontal and vertical directions of the screen is provided in the optical path ranging from the refractive faces of the prisms to a diffusing sheet. This diffusing member may be, for example, a particle-shaped light-diffusing material. If the Fresnel lens sheet 6 has the first incident-side prism section 10 or the second incident-side prism section 14 and the exit-side prism section 11, the above diffusing member is provided in the optical path ranging from the refractive faces of the first or second incident-side prisms to those of the exit-side prism section 11. Moiré can thus be further reduced.

In general, ultraviolet-cured resin is used to mold the prism sections of a Fresnel lens sheet. In this case, when providing prisms on both faces of the Fresnel lens sheet, the prisms on both faces require position matching for purposes such as improving efficiency of light and preventing the occurrence of moiré.

Figure 9:
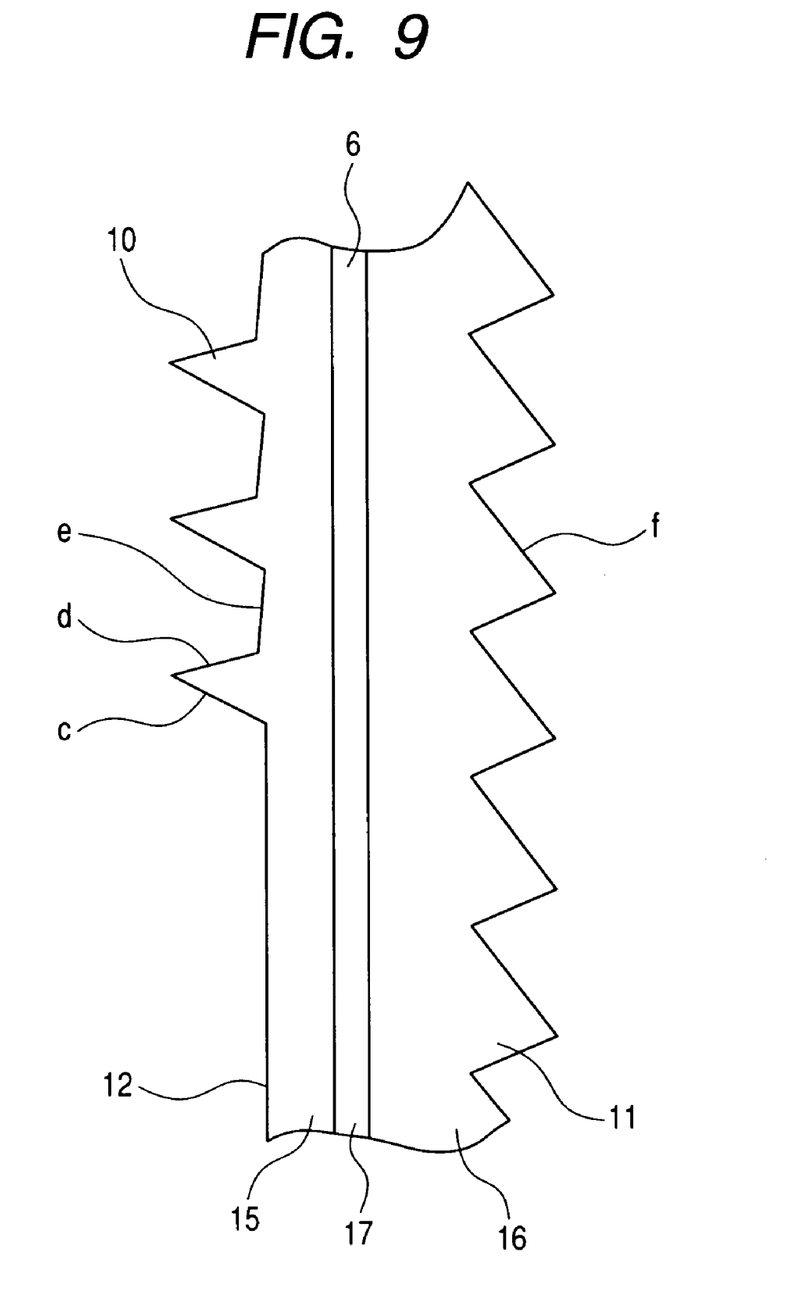
FIG. 9 is a view explaining an example of a manufacturing method for a Fresnel lens sheet according to the present invention.

An example of a manufacturing method for a Fresnel lens sheet according to the present invention is described below using FIG. 9. A refractive exit-side prism section 11 is molded at the transparent substrate 16 constituting a Fresnel lens sheet 6. An incident-side prism section 10 is formed on a transparent ultraviolet curable resin layer 15 by ultraviolet-ray curing. The face of the transparent ultraviolet curable resin layer 15 that is not formed with a prism section 10, and the face of the transparent substrate 16 that is not formed with the refractive prism section 11 are fixedly bonded using an adhesive layer 17.

At this time, not only the incident-side prism section 10, but also a planar section 12 may be formed by using ultraviolet-cured resin to integrate both sections as the transparent ultraviolet curable resin layer 15.

In addition, a substrate made of a material such as a copolymer of polymethyl methacrylate or methyl methacrylate, may be used as the transparent substrate 16, whereby the exit-side prism section 11 can be obtained by thermal compression molding of the substrate. Furthermore, a transparent substrate (not shown) of the transparent ultraviolet curable resin layer 15 having the incident-side prism section 10 formed thereon can use surface-treated polyethylene terephthalate to facilitate bonding of the ultraviolet-cured resin, and the adhesive layer 17 can use a high-transparency acrylic adhesive.

An example in which the transparent substrate with the incident-side prism section 10, and the transparent substrate 16 with the exit-side prism section 11 are fixedly bonded using the adhesive layer 17 has been described as a manufacturing method for the Fresnel lens sheet of the present invention. However, the transparent ultraviolet curable resin layer 15 may be stacked directly on the transparent substrate 16, and the incident-side prism section 10 may be formed by ultraviolet curable resin.

Description has also been given of an example in which the exit-side prism section 11 is formed by thermal compression molding of the transparent substrate 16 made of polymethyl methacrylate or methylmethacrylate styrene copolymer. This example, however, does not limit the present invention. For example, ultraviolet-ray curing may be used to form the exit-side prism section 11.

According to the present invention, reflection loss of the transmissive screen can be suppressed, even if the incident angle of the image light entering the upper left and right ends of the screen becomes excessive during the thinning-down of the set. According to the present invention, the moiré event occurring on the Fresnel lens sheet can also be minimized. According to the present invention, therefore, it is possible to obtain images whose brightness covering a range up to the upper left and right ends of the screen is high enough for display on a set reduced in thickness.

What is claimed is:

1. A transmissive screen onto which light is projected from an image generation source, said screen comprising:
   a Fresnel lens sheet;
   wherein said Fresnel lens sheet has, at its image generation source side, a plurality of optical elements each including at least a plane-of-incidence onto which the light comes in, an exit face from which the light that has come in from the plane-of-incidence exits after being refracted, and a refractive face on which the light that has exited from the exit face is refracted and then guided to the image-viewing side of said Fresnel lens sheet.

2. A transmissive screen onto which light is projected from an image generation source, said screen comprising:
   a Fresnel lens sheet;
   wherein said Fresnel lens sheet has a plurality of first incident-side prisms each including at least a plane-of-incidence onto which the light comes in, an exit face from which the light that has come in from the plane-of-incidence exits after being refracted, and a refractive face on which the light that has exited from the exit face is refracted and then guided to the image-viewing side of said Fresnel lens sheet, and
   wherein, at the image generation source side of said Fresnel lens sheet, the first incident-side prisms are provided in the region of an incident angle where a reflection loss becomes equal to or greater than a predetermined amount.

3. The transmissive screen according to claim 2, wherein the first incident-side prisms are provided in the region where the incident angle of the light becomes equal to or greater than 40 degrees.

4. The transmissive screen according to claim 2, wherein, at the image generation source side of said Fresnel lens sheet, the region where the incident angle of the light becomes equal to or smaller than the required value is formed as a planar section.

5. The transmissive screen according to claim 4, wherein an exit-side prism is provided in the range, at the image-viewing side of said Fresnel lens sheet, that includes a region opposite to the planar section, and the exit-side prism includes a refractive face for refracting the light passed through said Fresnel lens sheet, and causing the light to exit as light approximately parallel to an optical axis of said Fresnel lens sheet.

6. The transmissive screen according to claim 4, wherein an exit angle of the light exiting the refractive face of each of the first incident-side prisms, and an exit angle of the light exiting the planar section are approximately equal to each other.

7. The transmissive screen according to claim 2, wherein, at the image generation source side of said Fresnel lens sheet, a second incident-side prism having a refractive face for receiving the light, refracting the light that has been received, and guiding the light to the image-viewing side, is provided in the region where the incident angle of the light becomes equal to or smaller than the required value, and an apex angle of the second incident-side prism is greater than an apex angle of any of the first incident-side prisms.

8. The transmissive screen according to claim 7, wherein an exit angle of the light exiting the refractive face of each of the first incident-side prisms, and an exit angle of the light exiting the refractive face of the second incident-side prism are approximately equal to each other.

9. The transmissive screen according to claim 7, wherein:
a diffusing sheet for diffusing light in at least a horizontal direction is disposed at the image-viewing side of said Fresnel lens sheet; and
a diffusing member for diffusing image light in horizontal and vertical directions of said screen is provided in the optical path ranging from the refractive faces of the first incident-side prisms and the refractive face of the second incident-side prism, to the diffusing sheet.

10. The transmissive screen according to claim 7, wherein a diffusing member for diffusing image light in horizontal and vertical directions of said screen is provided in the optical path ranging from the refractive faces of the first incident-side prisms to the refractive face of the exit-side prism.

11. The transmissive screen according to claim 2, wherein an exit-side prism that includes a refractive face for refracting the light passed through said Fresnel lens sheet, and causing the light to exit as light approximately parallel to an optical axis of said Fresnel lens sheet, is provided at the image-viewing side thereof.

12. The transmissive screen according to claim 11, wherein a refractive index of the material constituting each of the first incident-side prisms is small, compared with a refractive index of the material constituting the exit-side prism.

13. An image display apparatus comprising:
an image generation source;
optics for enlarging and projecting the image sent from the image generation source; and
a transmissive screen for displaying the image projected from the optics,
wherein said transmissive screen comprises a Fresnel lens sheet; and
said Fresnel lens sheet has, at its image generation source side, a plurality of optical elements each including at least a plane-of-incidence onto which the light comes in, an exit face from which the light that has come in from the plane-of-incidence exits after being refracted, and a refractive face on which the light that has exited from the exit face is refracted and then guided to the image-viewing side of said Fresnel lens sheet.

14. An image display apparatus comprising:
an image generation source;
optics for enlarging and projecting the image sent from the image generation source; and
a transmissive screen for displaying the image projected from the optics,
wherein said transmissive screen comprises a Fresnel lens sheet and a diffusing sheet disposed at the image-viewing side of said Fresnel lens sheet;
said Fresnel lens sheet has a plurality of incident-side prisms each including at least a plane-of-incidence onto which the light comes in, an exit face from which the light that has come in from the plane-of-incidence exits after being refracted, and a refractive face on which the light that has exited from the exit face is refracted and then guided to the image-viewing side of said Fresnel lens sheet; and at the image generation source side of said Fresnel lens sheet, the incident-side prisms are provided in the region of an incident angle where a reflection loss becomes equal to or greater than a predetermined amount.

15. A Fresnel lens sheet used for a transmissive screen onto which the light sent from an image generation source is projected, wherein:
at the image generation source side of said Fresnel lens sheet are provided a plurality of optical elements each including at least a plane-of-incidence onto which the light comes in, an exit face from which the light that has come in from the plane-of-incidence exits after being refracted, and a refractive face on which the light that has exited from the exit face is refracted and then guided to the image-viewing side of said Fresnel lens sheet.

16. A Fresnel lens sheet used for a transmissive screen onto which the light sent from an image generation source is projected, wherein:
at the image generation source side of said Fresnel lens sheet are provided a plurality of incident-side prisms each including at least a plane-of-incidence onto which the light comes in, an exit face from which the light that has come in from the plane-of-incidence exits after being refracted, and a refractive face on which the light that has exited from the exit face is refracted and then guided to the image-viewing side of said Fresnel lens sheet; and at the image generation source side of said Fresnel lens sheet, the incident-side prisms are provided in the region where an incident angle of the light becomes equal to or greater than a required value.

17. The Fresnel lens sheet according to claim 16, wherein:
an exit-side prism that includes a refractive face for refracting the light passed though said Fresnel lens sheet, and then causing the light to exit as light approximately parallel to an optical axis of said Fresnel lens sheet, is provided at the image-viewing side thereof; and
the exit-side prism is formed by thermal compression molding of a substrate made of polymethyl methacrylate or methylmethacrylate styrene copolymer, and the incident-side prisms are each formed by ultraviolet curable resin.

18. The Fresnel lens sheet according to claim 16, wherein:
an exit-side prism that includes a refractive face for refracting the light passed though said Fresnel lens sheet, and then causing the light to exit as light approximately parallel to an optical axis of said Fresnel lens sheet, is provided at the image-viewing side thereof; and
a transparent ultraviolet curable resin layer having the exit-side prism is formed on a substrate, and onto the face of the substrate that is opposite to a face with the exit-side prism formed thereon is bonded a substrate on which a transparent ultraviolet curable resin layer with the incident-side prisms formed thereon.

* * * * *